F. A. McCABE.
LOCK.
APPLICATION FILED DEC. 2, 1919. RENEWED APR. 25, 1922.

1,431,316.

Patented Oct. 10, 1922.
5 SHEETS—SHEET 1.

WITNESSES

INVENTOR
F. A. McCABE,
BY
ATTORNEYS

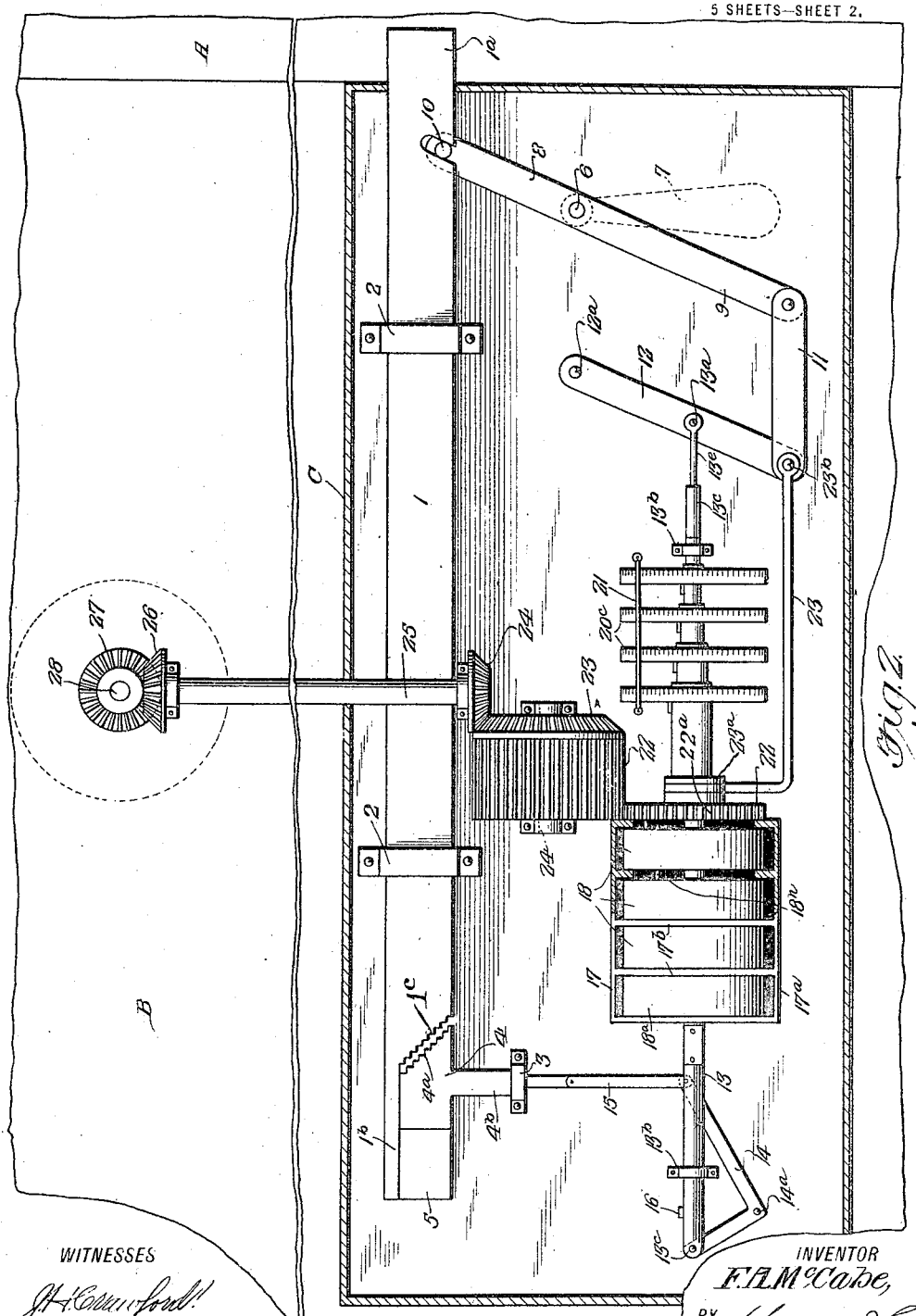

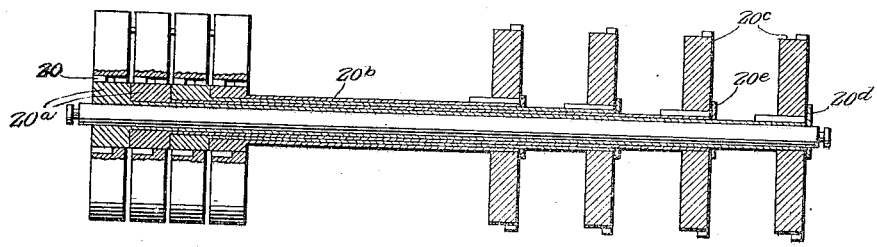
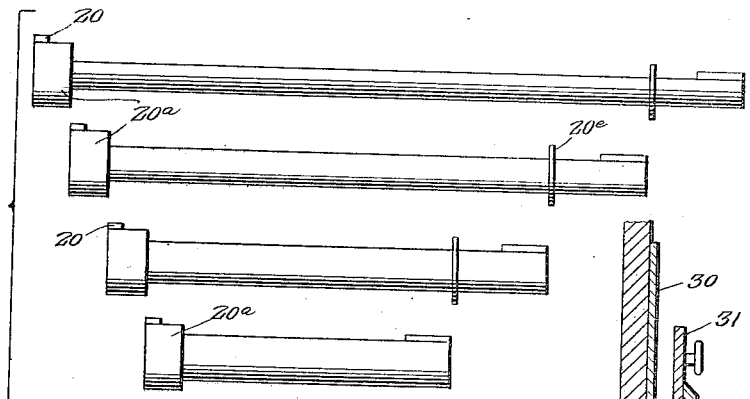
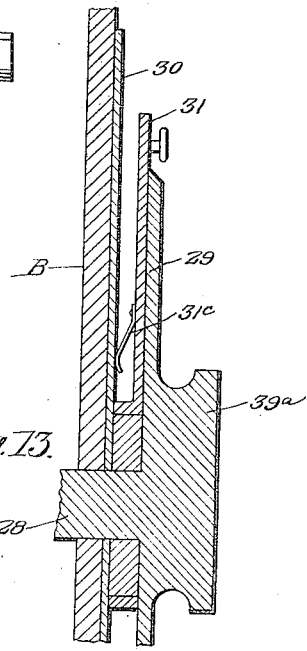
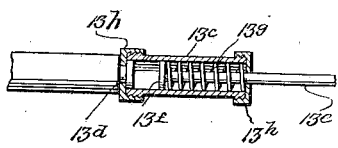

F. A. McCABE.
LOCK.
APPLICATION FILED DEC. 2, 1919. RENEWED APR. 25, 1922.
1,431,316.
Patented Oct. 10, 1922.
5 SHEETS—SHEET 4.
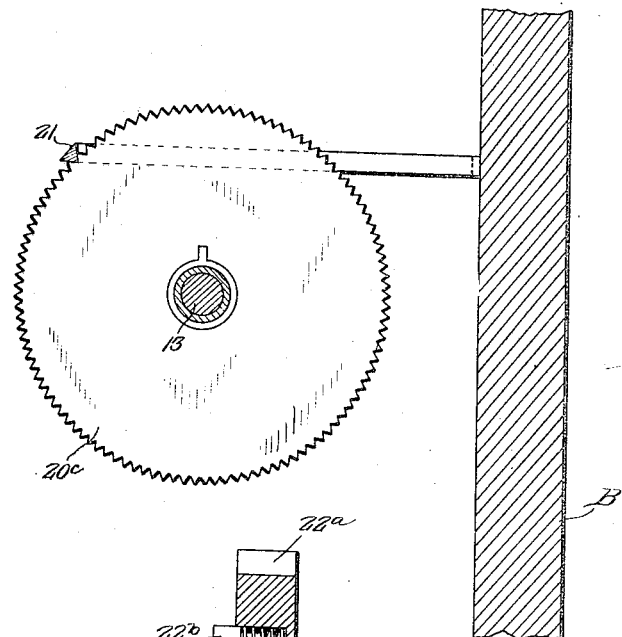
Fig. 3.
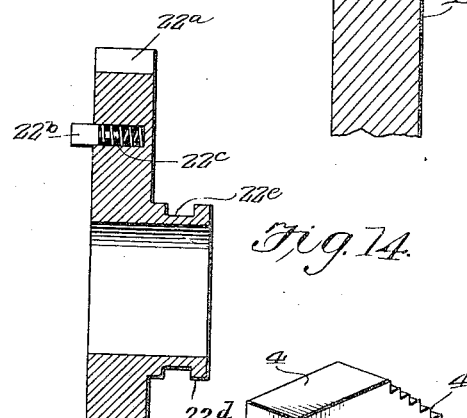
Fig. 6.   Fig. 14.
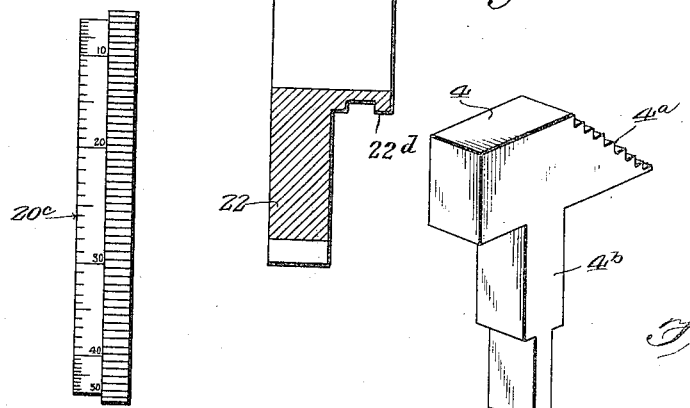
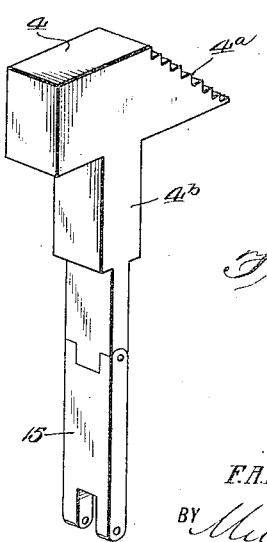
Fig. 15.
WITNESSES
JH Crawford
WF Buckley
INVENTOR
F. A. McCABE,
BY Munn & Co.
ATTORNEYS F. A. McCABE.
LOCK.
APPLICATION FILED DEC. 2, 1919. RENEWED APR. 25, 1922.
1,431,316.
Patented Oct. 10, 1922.
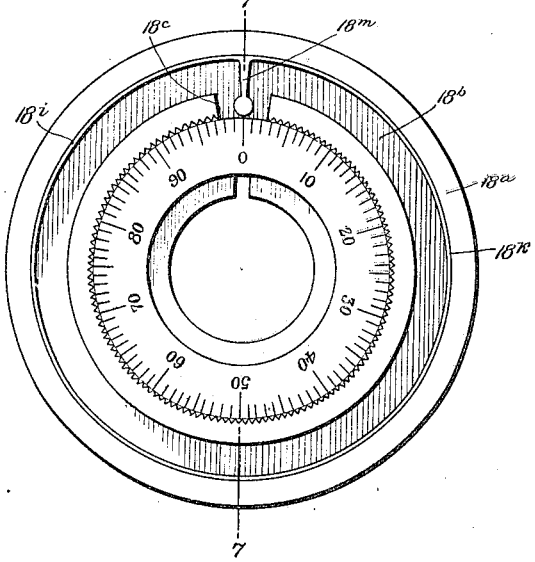
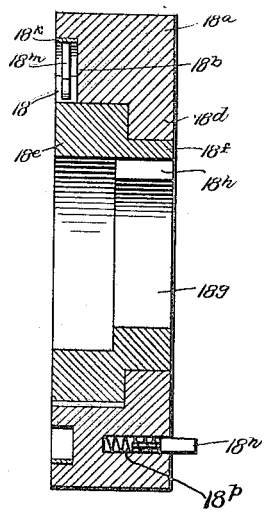
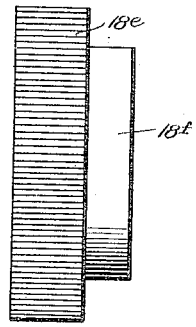
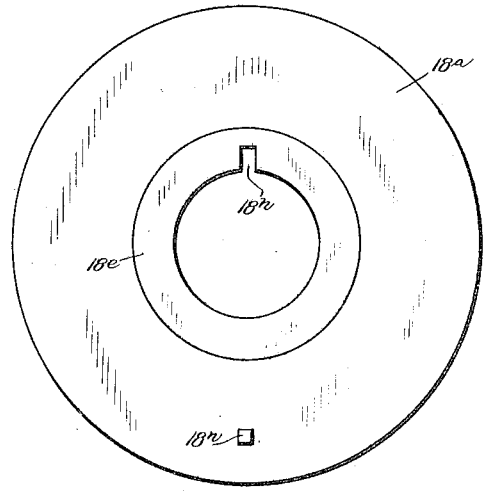
WITNESSES
INVENTOR
F. A. McCabe,
BY
ATTORNEYS Patented Oct. 10, 1922.

1,431,316

UNITED STATES PATENT OFFICE.

FRANK ALBERT McCABE, OF BLACKFOOT, MONTANA.

LOCK.

Application filed December 2, 1919, Serial No. 341,984. Renewed April 25, 1922. Serial No. 556,544.

*To all whom it may concern:*

Be it known that I, FRANK ALBERT MC-CABE, a citizen of the United States, and a resident of Blackfoot, in the county of Glacier and State of Montana, have invented certain new and useful Improvements in Locks, of which the following is a specification.

My invention relates in general to locks and in particular to an improved lock of the permutation type.

An important object of my invention is to provide an improved lock of this type which cannot be operated by any person unacquainted with the combination by the method known as "touch" or "sense of touch method," or any other similar method.

Another important object is to provide an improved lock of this type in which the locking means or bolts are not thrown by movement of the dial, but in which a separate and independent operating means is provided for operating or throwing the bolt.

Another important object is to provide an improved lock of this type in which the controlling means of the lock is automatically disconnected from the actuating means or dial immediately prior to the impartation of the operating force from the operating mechanism to the bolts or locking means to prevent any "feel" at the dial of contact or pressure in the controlling means and thereby preclude the possibility of the combination or necessary dial movements being "sensed" and executed by an unauthorized person.

Another important object is to provide an improved lock of the permutation type in which may be provided the greatest possible number of combinations.

Another object is to provide an improved lock of simple and durable construction, of relatively absolute security, of great efficiency and reliability in operation and of easy and ready manufacture.

Other objects and advantages reside in the certain novel features of the construction, arrangement and combination of parts and will become apparent as the description proceeds, reference being had to the accompanying drawings forming part of this specification in which:

Figure 2 is an assembly view in front elevation looking from the interior of the safe and showing the parts in locked position, the casing being broken away for the sake of illustration.

Figure 3 is a detailed view, partly in section and partly in elevation, showing the locking lugs and setting discs therefor associated with the rotating tumblers.

Figure 4 is a detailed view in elevation of the individual locking lugs and connecting sleeves.

Figure 5 is a side elevation of a setting disc showing the action of the locking bar.

Figure 6 is a detailed view in front elevation of a setting disc.

Figure 7 is a front elevational view of the rotating tumbler.

Figure 8 is a vertical section through line 7—7 of Figure 7, the tumbler as shown being turned 180 degrees about its vertical axis from the position it assumes in the organized lock.

Figure 9 is a detailed view of the inner section of the tumbler.

Figure 10 is the rear view in elevation of the rotating tumbler.

Figure 13 is a vertical sectional view through line 12—12 of Figure 1.

Figure 14 is a vertical section through the driving disk.

Figure 15 is a perspective view of the auxiliary locking bolt.

Figure 16 is a detailed view, partly in section, of the resilient extensible portion of the connecting rod.

Figure 1:
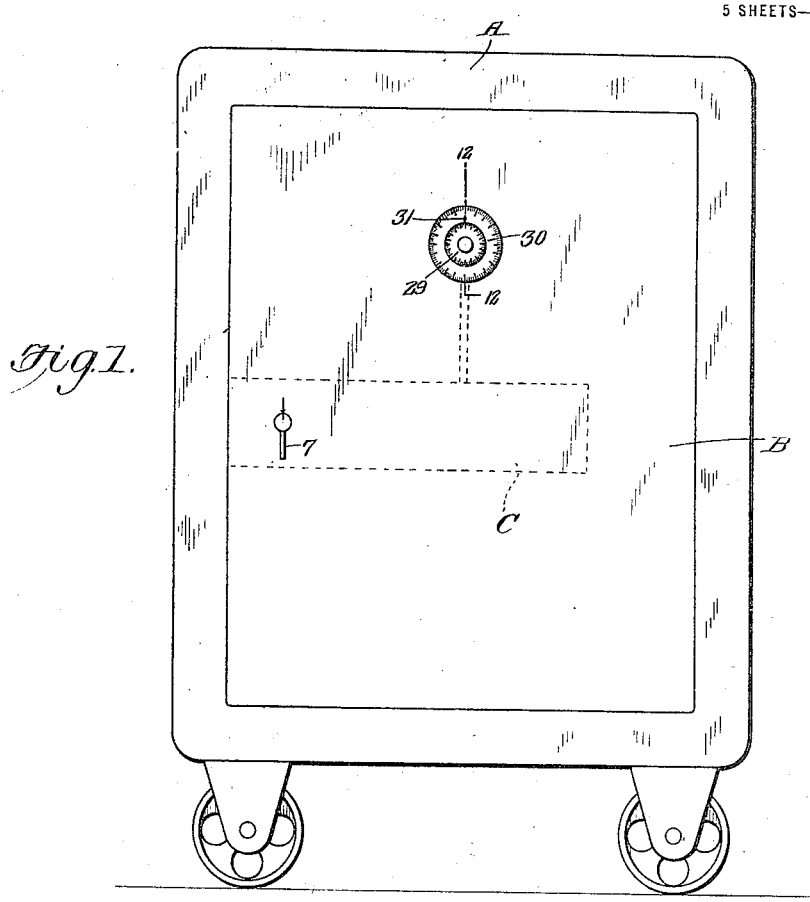
Figure 1 is a front elevational view showing the exterior appearance of a safe in which my invention is embodied.
Figures 11, 12:
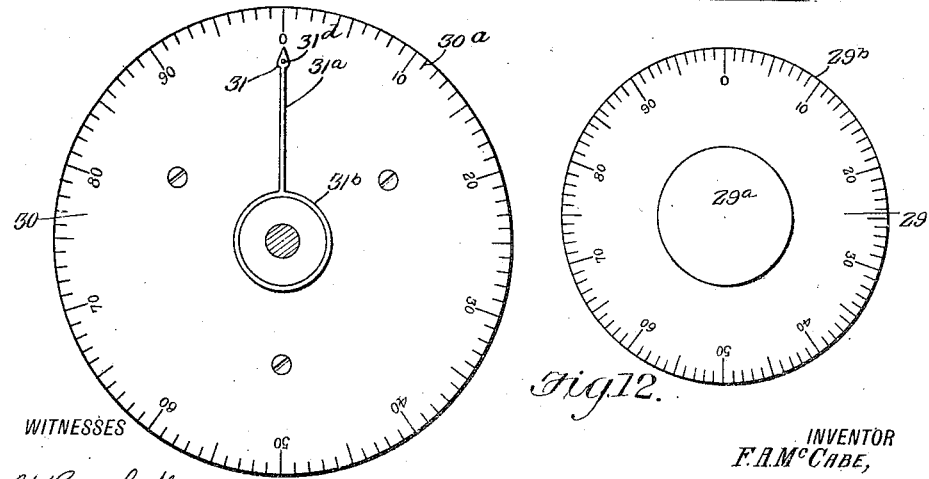
Figure 11 is a front elevational view of the stationary dial.
Figure 12 is a front elevational view of the movable dial.

Referring to the drawings, it will be seen that a preferred form of my invention is shown embodied in a safe structure, but it is to be understood that the invention can as readily be embodied in any structure for analogous purposes.

In the drawings, A indicates the safe structure as a whole and B indicates the door thereof. To the rear of the door, or in a suitable recess therein, a casing C is secured which houses the invention.

Within the casing, as shown especially in Figure 2, there is disposed a main locking bolt 1 which is mounted in suitable bearings 2 to slide horizontally and has an outer end $1^a$ adapted to enter a suitable socket or seat provided therefor in the wall of the safe. The inner end $1^b$ is reduced, as shown, to provide a suitable recess for the auxiliary locking bolt to be hereinafter described, and the inclined wall $1^c$ of the reduced portion is serrated. Mounted for vertical sliding movement in the bearing 3 is an auxiliary locking bolt 4 adapted when in locking position to be seated in the recess in the main locking bolt to maintain the main locking bolt in locking position. The auxiliary locking bolt has an inclined serrated wall $4^a$ and a reduced shank $4^b$ which slides in the bearing 3. A block 5 is secured to a stationary part of the safe door structure and acts as a guide both for the main locking bolt and the auxiliary bolt and further acts as an abutment for the auxiliary bolt when the same is exercising its locking function with respect to the main bolt. It is to be noted that when the main bolt is in locked position, as shown in Figure 2, and the auxiliary bolt is seated in the recess in the main bolt to maintain the same in locked position there is a slight space between the inclined walls of the respective bolts for a purpose to be hereinafter fully described.

A common means is provided for operating the main bolt and the auxiliary bolt, and it consists of a rock shaft 6 mounted in the wall of the safe door and having an operating handle 7 fixedly mounted on the outer end thereof and a crank fixedly mounted on the inner end thereof, having an upper arm 8 and lower arm 9. The upper arm 8 imparts motion to the main bolt by pin and slot connection 10. The lower arm of the crank is connected by a link 11 to a swinging crosshead 12 pivoted at $12^a$. At approximately the middle of the swinging crosshead, the adjacent end of a connecting rod 13 is connected as shown at $13^a$ and this connecting rod is mounted for sliding rectilinear movement in bearings $13^b$ and it is pivotally connected at $13^c$ to one arm of a bell crank 14 pivoted at $14^a$. The outer end of the other arm of the bell crank is connected by a link 15 to the shank $4^b$ of the auxiliary bolt 4. A stop lug 16 is provided on the connecting rod adjacent to the bell crank 14 and cooperates with the adjacent bearing $13^b$ to limit the movement of the connecting rod in one direction.

The connecting rod 13 is provided adjacent to the swinging crosshead 12 with a resilient extensible portion which comprises a hollow cylinder $13^c$, as shown in Figure 16, swiveled to the connecting rod, as at $13^d$. Mounted for reciprocatory movement in the cylinder $13^c$ is a plunger rod $13^e$ carrying a plunger head $13^f$ at its inner end. A coil spring $13^g$ is disposed between the plunger head and the outer end of the cylinder. As shown in Figure 16 each end of the cylinder is closed by a suitable cap $13^h$ having the required central bore therein to permit of the proper association with the connecting rod and with the plunger $13^e$ respectively and the plunger rod $13^e$ is pivoted to the swinging crosshead 12 at $13^a$. The coil spring $13^g$ is of sufficient strength to carry the strain, without compression, incident to the movement of the connecting rod, bell crank, link, etc., to operate the auxiliary locking bolt. When, however, the strain exceeds to any considerable degree, the amount necessary to operate the bolts and bolt operating mechanism, the spring is compressed and the connecting rod correspondingly extended.

A plurality of rotating tumblers indicated generally at 18 and preferably four in number are mounted on the connecting rod. These tumblers are contained in a cage consisting of top and bottom pieces 17 and $17^a$ respectively, and spacing plate rings $17^b$ mounted on the top and bottom pieces and disposed between each of the tumblers.

As shown particularly in Figures 7 to 10 inclusive, the tumblers each consist of an outer section $18^a$ having an annular circumferential groove or recess $18^b$ in one face and a radial groove or recess $18^c$ leading from said annular recess to the inner peripheral surface of the outer section. The inner peripheral surface of the outer section adjacent to the opposite face from the grooves is provided with an annular flange $18^d$. The inner section $18^e$ is disposed within the outer section so as to interfit therein and has a reduced portion $18^f$ to correspond with the flange $18^d$. The adjacent surfaces of the inner and outer sections are serrated as shown in Figure 7 and 9 so that they will not change their adjusted position and relation with respect to each other and the inner section is provided with indicia to indicate this relation. The inner periphery of the inner section is provided with an annular flange $18^g$ having a notch or gate $18^h$ therein. A flat ring $18^k$ of relatively slight cross-section as shown in Figure 7 is disposed in the recess $18^b$ and rests against the outer wall thereof. Integral with the ring $18^k$ is a radial arm $18^m$ which constitutes a movable abutment. The opposite face of the outer section is provided with a driving pin $18^n$ which is adapted to enter the annular recess $18^b$ of the adjacent tumbler and, when the tumblers are actuated, this pin eventually engages against the abutment $18^m$ to rotate the adjacent tumbler, and this action is repeated between each successive pair of tumblers. It will be noted that, when the driving pin engages the movable abutment, the movable abutment is moved from any position in which it may be placed in the radial recess $18^c$ to the wall of the recess opposite from the driving pin, and this arrangement admits of the entire 360 degrees being utilized. The driving pin is spring pressed being preferably constructed in precisely the same manner as the driving pin of the driving disk to be hereinafter more fully described and this provides a remedy in the event the driving pin were to be seated upon the arm or abutment 18<sup>m</sup>, as, upon movement of the tumblers, the driving pin would be displaced from the arm and the spring 18<sup>p</sup> would then project the same into the groove 18<sup>b</sup>.

A plurality of lock lugs 20 are mounted upon the connecting rod 13 and constrained to rectilinear motion therewith and are associated with the tumblers. The tumblers constitute obstructions for the lock lugs and prevent rectilinear movement thereof, and consequently rectilinear movement of the connecting rod 13, unless the notches or gates 18<sup>h</sup> of the tumblers are aligned with the lock lugs.

It is to be noted that there is a lock lug for each tumbler. These lock lugs are adjustable angularly or about the connecting rod but are not free for right line motion with respect thereto, and they are accordingly rigidly mounted either by being formed integral or otherwise upon collars 20<sup>a</sup> of successively increasing internal diameters. These collars are each integral or otherwise rigidly connected to sleeves 20<sup>b</sup> which are telescoped one within the other and of different lengths, the outer sleeve being the shorter and the inner ones of successively increasing lengths. The end of each sleeve remote from a lock lug is provided with a setting disk 20<sup>c</sup> which is keyed or otherwise fixed to the sleeve. The inner sleeve is freely rotatable with respect to the connecting rod and all of the sleeves are freely rotatable with respect to each other but the inner sleeve is constrained from right line movement with respect to the connecting rod and each of the sleeves are constrained from right line movement with respect to each other. This is preferably accomplished by providing a collar 20<sup>d</sup> secured on the connecting rod and collar 20<sup>e</sup> secured on each of the sleeves. Approximately one half of the periphery of each of the setting disks is toothed or serrated as shown in Figure 6 while indicia is provided upon the other half. This indicia is preferably numerals from zero to one hundred and corresponds with the indicia upon the permanent dial. By manipulating the setting disks 20<sup>c</sup> the locking lugs 20 are adjusted to the desired position and they are then locked and retained in this position by a resilient locking bar 21 engaging the serrated portion of the periphery. The tumblers and lock lugs together constitute controlling means for the bolt operating mechanism and so when the tumblers obstruct the lock lugs to prevent movement of the lugs the controlling means serves to lock the bolt mechanism.

A driving disk 22 is disposed about the connecting rod adjacent to the end tumbler 18 and its periphery is provided with gear teeth 22<sup>a</sup>. The driving disk is provided with a driving pin 22<sup>b</sup> and driving pin spring 22<sup>c</sup>, as shown in Figure 14. This driving pin enters the annular recess 18<sup>b</sup> of the end tumbler and, when the disk is actuated, this pin engages the movable abutment 18<sup>m</sup>. The driving disk and, consequently, the tumblers are actuated from the movable dial, and to carry out this purpose a suitable train of gearing is employed between the driving disk and the movable dial. This train includes a compound straight and beveled gear 23, the straight gear of which is always in mesh with the gear teeth of the driving disk 22, and the beveled gear of which is in mesh with the driving pinion 24 carried on the vertical shaft 25 driven by the pinions 26 and 27, the latter of which is carried on the inner end of the horizontal shaft or dial spindle 28.

The driving disc 22 is disposed as shown on the outer sleeve 20<sup>b</sup> and is freely movable thereon, both as to rectilinear movement and as to rotary movement having an integral annular collar 22<sup>d</sup> provided on its outer surface with an annular groove 22<sup>e</sup>. This annular groove receives a ring 23<sup>a</sup> carried on a release bar 23 which is connected at 23<sup>b</sup> to the swinging cross head 12. The ring 23<sup>a</sup> is loosely fitted in the groove 22<sup>e</sup> so as to permit free rotary movement of the driving disc with respect to the ring. As shown in Figure 2 the straight gear of the compound straight and beveled gear 23 is of much greater extent from end to end, and this permits the driving disc to be drawn along the same for a considerable distance while continuing to be in mesh therewith. It is obvious that, when the driving disc is drawn along the sleeve 20<sup>b</sup> and the gear 22, the driving pin 22<sup>b</sup> will be withdrawn from the annular groove 18<sup>b</sup> of the tumbler 18 and that, therefore, the connection between the tumblers and the dial is broken.

The dial spindle 28 carries at its outer end the movable dial 29 which has integral therewith an operating knob 29<sup>a</sup>. The movable dial carries indicia 29<sup>b</sup> in the form of numerals ranging from zero to one hundred in natural sequence, and this dial is associated and co-operates with a stationary dial 30, secured to the front wall of the safe and carrying like indicia 30<sup>a</sup>. The indicia of the movable dial corresponds to the indicia of the tumblers 18 and the indicia of the permanent dial 30 corresponds to the indicia of the setting discs 20<sup>c</sup> for the lock lugs 20. There is a slight space between the inner surface of the movable dial and the outer surface of the stationary dial and an indicating pointer 31 is disposed therein. The indicating pointer is to facilitate proper reading of the dials and it comprises a shank 31ª and a central ring 31ᵇ, the ring being disposed about the dial spindle. On the inner surface of the connecting shank is mounted a bowed blade spring 31ᶜ, the inner end of which is fastened to the rear side of the pointer and the outer end of which bears against the stationary dial. The central portion of the pointer proper is provided with a miniature operating knob 31ᵈ whereby the pointer may be moved to the required position.

In operation, after the locking lugs 20 have been set in desired position about the connecting rod and locked in this position by the action of the locking bar 21 with respect to the setting discs, the main bolt has been drawn to locking position by the operating handle 7 and the auxiliary bolt has been fitted in the recess in the main bolt and the tumblers have been drawn out of alignment with the lock lugs, the safe is then in locked position, and the parts assume the positions shown in Figure 2. If it is desired to open the safe, it is necessary to actuate the movable dial 29 through the movements necessary to align each of the tumblers with its corresponding lock lug, and after this, it is necessary to actuate the operating handle 7 to operate the bolt mechanism. The actuation of the operating handle is transmitted through the lock shaft and crank shaft, through the lower arm of the crank and ring to the swinging crosshead, and from the lower end of the swinging crosshead through the release bar to disconnect the driving disc from the tumblers, and, consequently, break the connection between the dial and the tumblers. Immediately after this connection has been broken, the swinging crosshead 12 has transmitted motion through the connecting rod 13, bell crank 14 and link 15 to withdraw the annular locking bolt from its seat in the main bolt, and then the upper arm of the crank actuates the main bolt to withdraw the shank from its seat in the wall of the safe. It is to be noted that this operation requires not only the arrangement and construction of the parts disclosed, but depends to an important extent also to the proportion of these parts. In this connection it is to be noted in the preferred form of my invention there is $\frac{1}{16}''$ between the lock lugs 20 and the flange 18ᵍ of the tumblers in the normal. When the operating handle 7 is actuated, the motion therefrom is transmitted to the connecting rod and during the first $\frac{1}{16}''$ of this movement the auxiliary locking bolt has moved down $\frac{1}{8}''$ and remains in this position until the main locking bolt has been moved to engage the same.

The release bar is also disposed at the extreme end of the swinging cross-head while the connecting rod is disposed at the central portion thereof and in this manner when the cross-head swings about the pivot 12ª the release bar partakes of a greater motion and is in such manner actuated to disengage the driving disc from the tumblers prior to the time the lock lugs 20 engage the flange 18ᵍ of the tumblers. The connection between the tumblers and the dial has thus been broken and this prevents any "feel" at the dial of the contact of the lock lugs and the tumblers which would be essential if the lock were to be opened by the methods known as "touch" or "sense of touch," or by any like method.

I claim:—

1. In a lock of the character described, a main locking bolt, an auxiliary locking bolt for engaging said main locking bolt for maintaining the same in locked position, a rock shaft, an operating handle fixed on the outer end of said rock shaft, a crank fixed on the inner end of said rock shaft having an upper arm and a lower arm, a pin and slot connection between said upper arm and said main bolt, a connecting rod, a bell crank, a link connection from said lower crank arm to said auxiliary bolt, rotating tumblers associated with said connecting rod, rotatable lock lugs constrained to longitudinal motion with said connecting rod, setting means for determining and maintaining the angular position of said lock lugs about said connecting rod, a dial, a releasable driving disc for said tumblers, means connecting said dial with said driving disc and release means adapted to disengage said driving disc from said tumblers and thereby break the connection between said tumblers and said dial prior to the operation of said bolt mechanism.

2. In a lock of the character described, a main locking bolt, an auxiliary locking bolt for engaging said main locking bolt and maintaining the same in locked position, a rock shaft, an operating handle fixed on the outer end of said rock shaft, a crank fixed on the inner end of said rock shaft having an upper arm and a lower arm, a pin and slot connection between said upper arm and said main bolt, a connecting rod, a bell crank, link connection from said lower crank arm to said auxiliary bolt, rotating tumblers associated with said connecting rod, rotatable lock lugs constrained to longitudinal motion with said connecting rod, setting means for determining and maintaining the angular position of said lock lugs with respect to said connecting rod, a dial and means for connecting said dial with said tumblers, all as and for the purposes set forth.

3. In a lock of the character described, a main locking bolt, an auxiliary locking bolt for engaging said main locking bolt and maintaining the same in locked position, a rock shaft, an operating handle fixed on the outer end of said rock shaft, a crank fixed on the inner end of said rock shaft having an upper arm and a lower arm, a pin and slot connection between said upper arm and said main bolt, a connecting rod, a bell crank, link connection from said lower crank arm to said auxiliary bolt, rotating tumblers associated with said connecting rod, lock lugs adapted to co-operate with said tumblers, a dial and means connecting said dial with said tumblers, all as and for the purposes set forth.

4. In a lock of the character described, a main locking bolt, an auxiliary locking bolt for engaging said main locking bolt and maintaining the same in locked position, a rock shaft, an operating handle fixed on the outer end of said rock shaft, a crank fixed on the inner end of said rock shaft having an upper arm and a lower arm, a pin and slot connection between said upper arm and said main bolt, a connecting rod, a bell crank, a link connection from said lower crank arm to said auxiliary bolt, controlling means associated with said connecting rod and means for actuating said controlling means, all as and for the purposes set forth.

5. In a lock of the character described, a main locking bolt, an auxiliary locking bolt for engaging said main locking bolt and maintaining the same in locked position, a rock shaft, an operating handle fixed on the outer end of said rock shaft, a crank fixed on the inner end of said rock shaft having an upper arm and a lower arm, a pin and slot connection between said upper arm and said main bolt, a connecting rod, a bell crank, a link connection from said lower crank arm to said auxiliary bolt, controlling means associated with said connecting rod, means for actuating said controlling means and release means adapted to disengage said controlling means from said actuating means to break the connection between said controlling means and said actuating means prior to the operation of said bolt mechanism, all as and for the purposes set forth.

6. In a lock of the character described, locking means, operating means for said locking means, controlling means for said locking means, a dial for operating said controlling means, means connecting said dial with said controlling means and means actuated by said operating means to disconnect said dial from said controlling means prior to the impartation of the operating force from said operating means to said locking means, all as and for the purposes set forth.

7. In a lock of the character described, locking means, operating means for said locking means, controlling means for said locking means, a dial, means connecting said dial with said controlling means and means to disconnect said dial from said controlling means prior to the impartation of the operating force from said operating means to said locking means, all as and for the purposes set forth.

8. In a lock of the character described, locking means, operating means for said locking means, controlling means for said locking means, a dial for actuating said controlling means and means to disconnect said dial from said controlling means prior to the impartation of the operating force from said operating means to said locking means, all as and for the purposes set forth.

9. In a lock of the character described, a main locking bolt, an auxiliary locking bolt for maintaining said locking bolt in locked position, common operating means for said bolts, and controlling means, including rotating tumblers, rotatable lock lugs normally constrained against right line movement by said tumblers, a dial for actuating said tumblers to release or to lock position, means connecting said dial with said tumblers and means actuated by said operating means to withdraw said connecting means to break the connection betwen said dial and said rotatable tumblers prior to the impartation of the operating force from said operating means to said locking means, all as and for the purposes set forth.

10. In a lock of the character described, a main locking bolt, an auxiliary locking bolt for maintaining said locking bolt in locked position, common operating means for said bolts, and controlling means, including rotatable tumblers, lock lugs associated with said tumblers, a dial adapted to actuate said tumblers and means to disconnect said dial from said tumblers prior to the impartation of the operating force from said operating means to said locking means, all as and for the purposes set forth.

11. In a lock of the character described, locking means, auxiliary locking means to maintain said locking means in locked position, controlling means, actuating means for said controlling means, operating means for said locking means and means to disconnect said controlling means from its actuating means prior to the impartation of the operating force from said operating means to said locking means, all as and for the purposes set forth.

12. In a lock of the character described, locking means, auxiliary locking means to maintain said locking means in locked position, controlling means, actuating means for said controlling means, common operating means for said locking means and means to disconnect said controlling means from its actuating means prior to the impartation of the operating force from said operating means to said locking means, all as and for the purposes set forth.

13. In a lock of the character described, locking means and controlling means, said controlling means including dial actuated rotating tumblers, rotatable lock lugs co-operating with said tumblers to constrain said locking means, setting means for said rotatable lock lugs, means for maintaining said setting means in predetermined position and means for releasing said locking means when said tumblers are set in release position with respect to said lock lugs, all as and for the purposes set forth.

14. In a lock of the character described, a locking bolt, auxiliary locking means for maintaining said locking bolt in locked position and controlling means for said auxiliary locking means, including dial controlled rotary tumblers and operating handle actuated lock lugs co-operating with said tumblers, all as and for the purposes set forth.

15. In a lock of the character described, locking means, rotatable tumblers and rotatable lock lugs for controlling said locking means, a stationary dial for said lock lugs and a movable dial for said tumblers, all as and for the purposes set forth.

16. In a lock of the character described, a plurality of rotating tumblers, each of which includes an outer ring-like section having an annular flange formed on the marginal portion of its inner periphery at one face thereof and having an annular circumferential recess formed in the opposite face thereof and a radial recess of relatively small circumferential extent communicating with said annular recess and leading to the inner periphery of said ring, a ring of flat and relatively slight cross section seated in said annular recess and bearing against the outer wall thereof and having a radial arm projecting into said radial recess, a driving pin on the opposite face of said outer section from said annular recess adapted to be normally disposed in the annular recess of the adjacent tumbler and to drive said adjacent tumbler by engagement with the radial arm of said ring, and an inner section fitted within said outer section having its outer walls corresponding in contour to the inner walls of said outer section and having an annular flange formed on the marginal portion of its inner periphery provided with a gate, all as and for the purposes set forth.

17. In a lock of the character described, a rotating tumbler including an outer ring-like section having an annular flange formed on the marginal portion of its periphery at one face thereof and having an annular circumferential recess formed in the opposite face thereof and a radial recess of relatively small circumferential extent communicating with said annular recess and leading to the inner periphery of said ring, a ring of flat and relatively slight cross section seated in said annular recess and bearing against the outer wall thereof and having a radial arm projecting into said radial recess, and an inner section seated within said outer section having its outer walls corresponding in contour to the inner walls of said outer section and having an annular flange formed on the marginal portion of its inner periphery provided with a gate, all as and for the purposes set forth.

18. In a lock of the character described, a rotating tumbler including a ring-like structure having an annular groove in one face and a radial groove of relatively small circumferential extent communicating with said annular groove and leading to the inner periphery of said ring, and a ring of flat and relatively slight cross section seated in said annular groove and bearing against the outer wall thereof and having a radial arm projecting inwardly from said flat ring into said radial recess, all as and for the purposes set forth.

19. In a lock of the character described, a main locking bolt, an auxiliary locking bolt for maintaining said main locking bolt in locked position, a rock shaft, an operating handle fixed on one end of said rock shaft, a crank fixed on the other end of said rock shaft having an upper arm connected to said main bolt and having a lower arm, a connecting rod, a bell crank, a link connection from said lower crank arm to said auxiliary bolt, said connecting rod having a resilient portion adjacent to said crank arm adapted to be extended when the strain on said rod exceeds a predetermined point and controlling means mounted on said connecting rod beyond said resilient extensible portion, all as and for the purposes set forth.

20. In a lock of the character described, a main locking bolt, an auxiliary locking bolt for maintaining said main locking bolt in locked position, a rock shaft, an operating handle fixed on one end of said rock shaft, a crank fixed on the other end of said rock shaft having an upper arm connected to said main bolt and having a lower arm, a connecting rod, a bell crank, a link connection from said lower crank arm to said auxiliary bolt, said connecting rod having a resilient portion adjacent to said crank arm adapted to be extended when the strain on said connecting rod exceeds the point necessary to communicate force sufficient to actuate said locking means, all as and for the purposes set forth.

21. In a lock of the character described, locking means, operating means for said locking means, controlling means including rotating tumblers, a plurality of rotatable telescopic sleeves of successively increasing length, a collar carried by the end of each of said sleeves, and lock lugs carried on said collars, a dial for actuating said tumblers, and means connecting said dial with said tumblers.

22. In a lock of the character described, locking means, operating means for said locking means, controlling means including rotating tumblers, a plurality of rotatable telescopic sleeves of successively increasing length, a collar carried by the end of each of said sleeves, and lock lugs carried on said collars, a dial for actuating said tumblers, means connecting said dial with said tumblers, and means actuated by said operating means to disconnect said dial from said controlling means prior to the impartation of the operating force from said operating means to said locking means.

23. In a lock of the character described, locking means, operating means for said locking means, controlling means including rotating tumblers, a plurality of rotatable sleeves, and lock lugs connected to the sleeves, a dial for actuating said tumblers, and means connecting said dial with said tumblers.

FRANK ALBERT McCABE.